US008279212B2

(12) United States Patent
Kim

(10) Patent No.: US 8,279,212 B2
(45) Date of Patent: Oct. 2, 2012

(54) POWER SUPPLY AND ORGANIC LIGHT EMITTING DISPLAY USING THE SAME

(75) Inventor: Min-Cheol Kim, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 351 days.

(21) Appl. No.: 12/637,726

(22) Filed: Dec. 14, 2009

(65) Prior Publication Data

US 2010/0295834 A1 Nov. 25, 2010

(30) Foreign Application Priority Data

May 19, 2009 (KR) ........................ 10-2009-0043427

(51) Int. Cl.
*G09G 5/00* (2006.01)
*H02J 1/00* (2006.01)

(52) U.S. Cl. ......................................... 345/211; 345/87

(58) Field of Classification Search .................... 345/76, 345/87, 211, 212, 214; 307/41; 713/300, 713/310, 320
See application file for complete search history.

(56) References Cited

U.S. PATENT DOCUMENTS

| | | | | |
|---|---|---|---|---|
| 7,312,771 | B2 * | 12/2007 | Iwamura | 345/76 |
| 7,420,552 | B2 * | 9/2008 | Kushima et al. | 345/211 |
| 2008/0291190 | A1 * | 11/2008 | Kim et al. | 345/211 |
| 2008/0303762 | A1 * | 12/2008 | Yasuda et al. | 345/87 |

FOREIGN PATENT DOCUMENTS

| | | |
|---|---|---|
| JP | 2006-074993 | 3/2006 |
| KR | 10-2007-0023955 A | 3/2007 |
| KR | 10-2008-0010789 A | 1/2008 |
| KR | 10-2008-0010991 A | 1/2008 |
| KR | 10-2009-0021742 A | 3/2009 |
| KR | 10-0894606 | 4/2009 |

OTHER PUBLICATIONS

KIPO Office action dated Jun. 27, 2011 in priority Korean application No. 10-2009-0043427, 1 sht.

* cited by examiner

*Primary Examiner* — Hoa T Nguyen
*Assistant Examiner* — Andrew Sasinowski
(74) *Attorney, Agent, or Firm* — Christie, Parker & Hale, LLP

(57) ABSTRACT

An organic light emitting display includes a first power block for receiving a first input voltage to output a first output voltage and configured to be driven in a normal operation mode corresponding to an enable signal, a second power block for receiving a second input voltage to output a second output voltage and configured to be driven in an alternate operation mode corresponding to the enable signal, and a voltage input unit for transmitting the first input voltage to the first power block in the normal operation mode, and for transmitting the second input voltage to the second power block and stopping the transmitting of the first input voltage to the first power block in the alternate operation mode, corresponding to the enable signal.

12 Claims, 3 Drawing Sheets

POWER SUPPLY AND ORGANIC LIGHT EMITTING DISPLAY USING THE SAME

CROSS-REFERENCE TO RELATED APPLICATION

This application claims priority to and the benefit of Korean Patent Application No. 10-2009-0043427, filed on May 19, 2009, in the Korean Intellectual Property Office, the entire content of which is incorporated herein by reference.

BACKGROUND

1. Field

The following description relates to a power supply and an organic light emitting display using the same.

2. Description of the Related Art

Recently, various flat panel displays (FPDs) having reduced weight and volume when compared to cathode ray tubes (CRTs) are being developed. FPDs include liquid crystal displays (LCDs), field emission displays (FEDs), plasma display panels (PDPs), and organic light emitting displays.

Among the FPDs, the organic light emitting display displays an image using organic light emitting diodes (OLEDs) that generate light through the re-combination of electrons and holes corresponding to a flow of current. In the OLEDs, a light emitting layer is made of an organic material.

The organic light emitting display is used widely in the market in, for example, personal digital assistants (PDAs) and MP3 players, in addition to in mobile telephones, due to various advantages such as excellent color reproducibility and small or reduced thickness.

The organic light emitting display includes a power supply. The power supply receives a voltage from the outside, converts the received voltage into a voltage suitable for each driver, and transmits the voltage to each driver.

That is, for supplying a voltage to each driver, a predetermined voltage is received for generating and transmitting a specific voltage. When an input voltage is not transmitted or interrupted due to factors such as an external environment, the specific voltage cannot be generated, and driving cannot be properly performed. That is, stable driving cannot be properly performed.

SUMMARY OF THE INVENTION

Accordingly, exemplary embodiments of the present invention provide a power supply for stabilizing voltage generation and achieving low power consumption, and an organic light emitting display using the same.

According to an aspect of an exemplary embodiment of the present invention, there is provided a power supply, including a first power block for receiving a first input voltage to output a first output voltage and configured to be driven in a normal operation mode corresponding to an enable signal, a second power block for receiving a second input voltage to output a second output voltage and configured to be driven in an alternate operation mode corresponding to the enable signal, and a voltage input unit for transmitting the first input voltage to the first power block in the normal operation mode, and for transmitting the second input voltage to the second power block and stopping the transmitting of the first input voltage to the first power block in the alternate operation mode, corresponding to the enable signal.

According to an aspect of another exemplary embodiment of the present invention, there is provided an organic light emitting display, including a display region for displaying an image corresponding to scan signals and data signals, a scan driver for generating the scan signals and transmitting the scan signals to the display region, a data driver for generating the data signals and transmitting the data signals to the display region, a power supply for supplying a driving voltage to the display region, the scan driver, and the data driver, and a controller for monitoring a first input voltage and for selecting one of a normal operation mode or an alternate operation mode and outputting an enable signal corresponding to the monitoring of the first input voltage. The power supply includes a first power block for receiving the first input voltage to output a first output voltage and configured to be driven in the normal operation mode corresponding to the enable signal, a second power block for receiving a second input voltage to output a second output voltage and configured to be driven in the alternate operation mode corresponding to the enable signal, and a voltage input unit for transmitting the first input voltage to the first power block in the normal operation mode, and for transmitting the second input voltage to the second power block and stopping the transmitting of the first input voltage to the first power block in the alternate operation mode, corresponding to the enable signal.

In the power supply according to exemplary embodiments of the present invention and the organic light emitting display using the same, when an input voltage is not transmitted or is interrupted due to a change in an external environment, the power supply can generate a voltage, and the voltage can be stably supplied.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
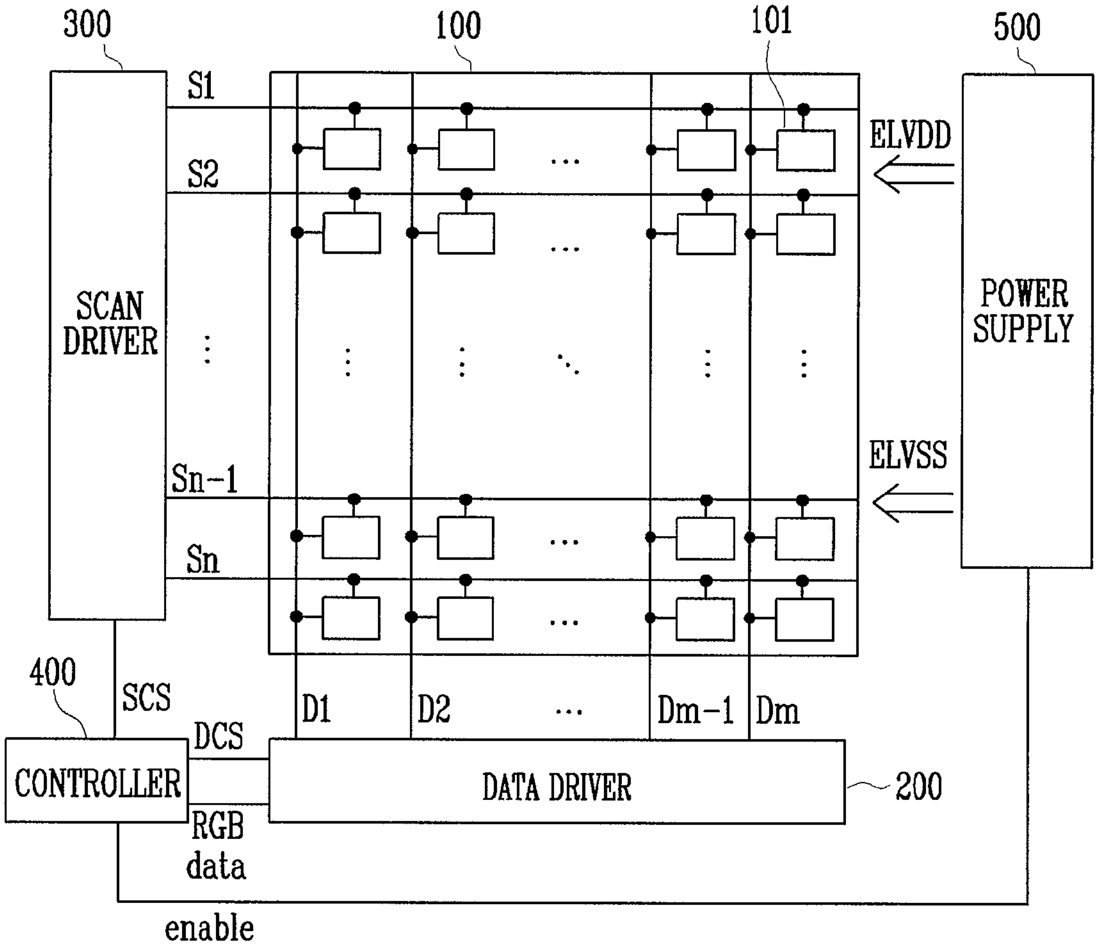
FIG. 1 is a schematic block diagram illustrating a structure of an organic light emitting display according to an embodiment of the present invention.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via one or more additional elements. Further, some of the elements that are not essential to the complete understanding of the invention are omitted for clarity. Also, like reference numerals refer to like elements throughout.

Hereinafter, exemplary embodiments of the present invention will be described in detail with reference to the accompanying drawings.

FIG. 1 is a schematic block diagram illustrating a structure of an organic light emitting display according to an embodiment of the present invention. Referring to FIG. 1, the organic light emitting display includes a display region 100, a data driver 200, a scan driver 300, a controller 400, and a power supply 500.

A plurality of pixels 101 are arranged in the display region 100, and each of the pixels 101 includes an organic light emitting diode (OLED) for emitting light corresponding to a flow of current. The display region 100 includes n scan lines S1, S2, . . . , Sn−1, and Sn formed in a row direction for transmitting scan signals and m data lines D1, D2, . . . , Dm−1, and Dm formed in a column direction for transmitting data signals.

In addition, the display region 100 receives a first voltage ELVDD and a second voltage ELVSS from the power supply 500. Therefore, in the display region 100, current flows to the OLED corresponding to the scan signals, the data signals, the first voltage ELVDD, and the second voltage ELVSS, to emit light and to display an image.

The data driver 200 generates data signals using image signals having red, blue, and green components. The data driver 200 is coupled to the data lines D1, D2, . . . , Dm−1, and Dm of the display region 100 to apply the generated data signals to the display region 100. In addition, the data driver 200 receives a driving voltage from the power supply 500 to operate.

The scan driver 300 is coupled to the scan lines S1, S2, . . . , Sn−1, and Sn and transmits scan signals to rows of the display region 100. The data signals output from the data driver 200 are transmitted to the pixels 101 when corresponding scan signals are transmitted so that voltages corresponding to the data signals are transmitted to the pixels 101. The scan driver 300 also receives the driving voltage from the power supply 500 to operate.

The controller 400 controls the driving of the data driver 200, the scan driver 300, and the power supply 500. In particular, the controller 400 transmits an enable signal Enable to the power supply 500 to control the operation of the power supply 500. The controller 400 detects or monitors a first input voltage input to the power supply 500 so that, when the first input voltage is detected, the power supply 500 can perform or operate in a normal operation mode using the enable signal Enable. When the first input voltage is not detected, that is, when a voltage lower than or below a predetermined voltage (e.g., a threshold voltage) is detected, the power supply 500 can perform or operate in an alternate operation mode using the enable signal Enable.

The power supply 500 transmits an output voltage to the display region 100, the data driver 200, and the scan driver 300. In particular, the driving of the power supply 500 is determined by the enable signal Enable transmitted from the controller 400. The power supply 500 may be divided into a plurality of blocks. When one block does not operate, another block operates so that a voltage can be stably supplied. That is, the power supply 500 receives first and second input voltages from the plurality of blocks to operate. Therefore, when the first input voltage is not transmitted or is interrupted due to external factors, the output voltage can be output by another input voltage.

Figure 2:
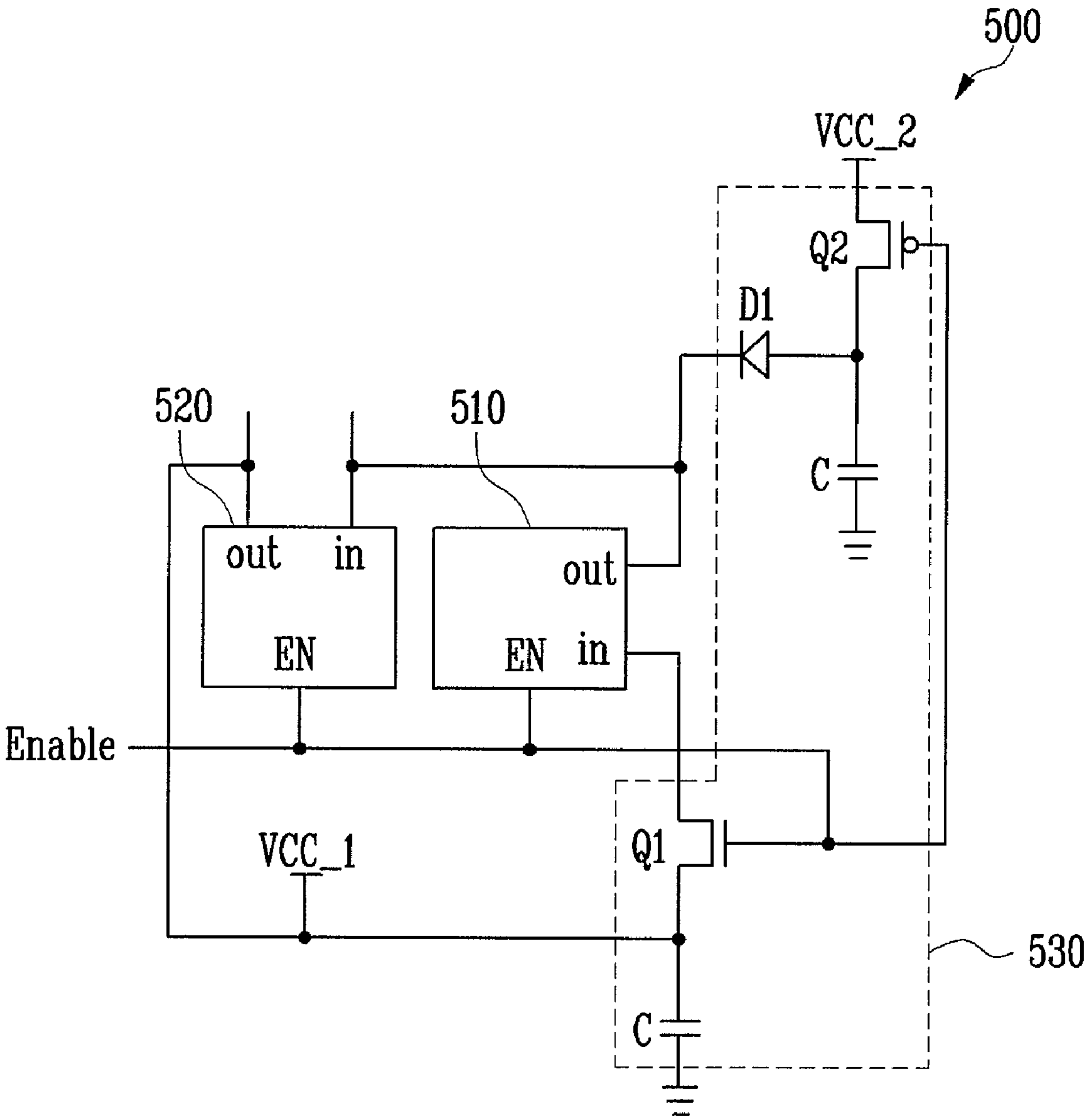
FIG. 2 is a schematic block diagram illustrating a structure of a power supply according to an embodiment of the present invention.

FIG. 2 is a schematic block diagram illustrating a structure of a power supply according to an embodiment of the present invention. Referring to FIG. 2, the power supply 500 includes a first power block 510, a second power block 520, and a voltage input unit 530.

The first power block 510 receives an enable signal Enable to operate. The first power block 510 receives a first input voltage VCC_1 and adjusts the voltage to output a first output voltage. The first power block 510 operates when the enable signal Enable is at a high level.

The second power block 520 also receives the enable signal Enable to operate. The second power block 520 receives a second input voltage VCC_2 to output a second output voltage. The second power block 520 operates when the enable signal Enable is at a low level.

The voltage input unit includes a first switch Q1 and a second switch Q2. The first switch Q1 transmits the first input voltage VCC_1 to the first power block 510 corresponding to operation of the enable signal Enable. The second switch Q2 transmits the second input voltage VCC_2 to the second power block 520 corresponding to the operation of the enable signal Enable. The first output voltage output from the first power block 510 can also be transmitted to the second power block 520. A diode D1 for blocking the first output voltage from being transmitted to the second switch Q2 is coupled to the voltage input unit 530. A capacitor C may be coupled to each of the first switch Q1 and the second switch Q2 so that the first input voltage VCC_1 and the second input voltage VCC_2 can be maintained.

The first switch Q1 and the second switch Q2 are provided as transistors. In one embodiment, the first switch Q1 is an NMOS transistor and the second switch Q2 is a PMOS transistor.

Figure 3A:
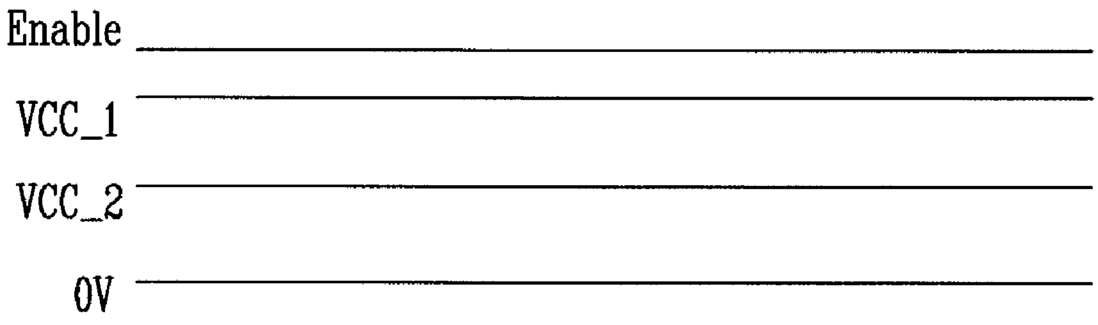
FIGS. 3A and 3B are waveform diagrams illustrating an operation of the power supply of FIG. 2.
Figure 3B:
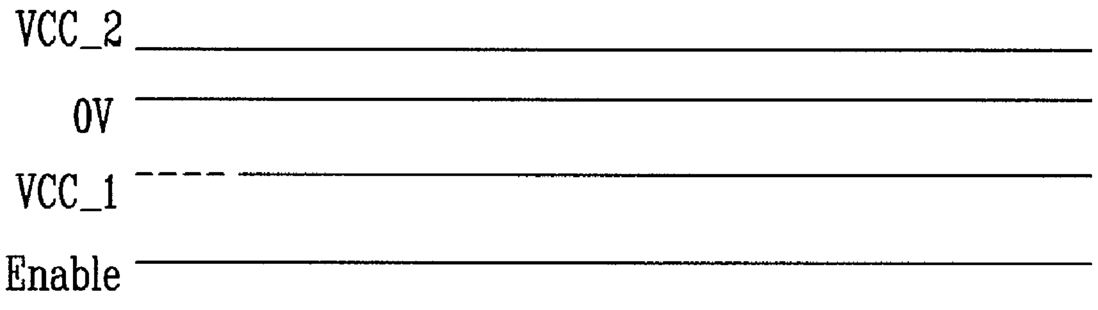

FIGS. 3A and 3B are waveform diagrams illustrating operation of the power supply of FIG. 2 in relation to a reference voltage 0V. FIG. 3A illustrates a normal operation mode in which the first input voltage VCC_1 is transmitted to the power supply. FIG. 3B illustrates an alternate operation mode in which the first input voltage VCC_1 is not transmitted to or is interrupted from the power supply 500. That is, in the normal operation mode, the enable signal, the first input voltage, and the second input voltage are higher than 0V. In the alternate operation mode, since the first input voltage is not transmitted or is interrupted, the first input voltage is lower than 0V.

First, in the normal operation mode, the controller 400 transmits the enable signal Enable at a high level. That is, the first switch Q1 is turned on, the first power block 510 is driven, the second switch Q2 is turned off, and the second power block 520 is not driven. Therefore, the first input voltage VCC_1 is transmitted to the input end of the first power block 510 through the first switch Q1. The first power block 510 generates the first output voltage using the first input voltage VCC_1. The diode D1 prevents or blocks the first output voltage generated by the first power block 510 from being transmitted to the second switch Q2, to protect the second switch Q2.

Since the first input voltage VCC_1 is directly coupled to the output end of the second power block 520, although the second power block 520 is not being driven, the first input voltage VCC_1 is directly output through the output end of the second power block 520.

That is, in the normal operation mode, the first output voltage is output through the first power block 510, and the first input voltage VCC_1 is directly output through the second power block 520.

In the alternate operation mode where the first input voltage VCC_1 may have been intercepted or blocked by external factors, the controller 400 transmits the enable signal Enable at a low level. That is, the first switch Q1 is turned off and the first power block 510 is not driven. In addition, the second switch Q2 is turned on and the second power block 520 is driven. Therefore, the second input voltage VCC_2 is transmitted to the input end of the second power block 520 through the second switch Q2. Therefore, the second power block 520 receives the second input voltage VCC_2, and outputs a second output voltage.

Therefore, in the power supply 500, although the first input voltage VCC_1 is turned off or interrupted, the second power block 520 receives the second input voltage VCC_2 to operate, such that the power supply 500 can output a voltage. At this time, the second output voltage can be used as the first input voltage VCC_1. The second output voltage can then be used as, for example, the first voltage ELVDD for the display region 100.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A power supply, comprising:

a first power block for receiving a first input voltage to output a first output voltage and configured to be driven in a normal operation mode corresponding to an enable signal;

a second power block for receiving a second input voltage to output a second output voltage and configured to be driven in an alternate operation mode corresponding to the enable signal; and a voltage input unit for transmitting the first input voltage to the first power block in the normal operation mode, and for transmitting the second input voltage to the second power block and stopping the transmitting of the first input voltage to the first power block in the alternate operation mode, corresponding to the enable signal;

wherein the first input voltage is directly coupled the second power block.

2. The power supply as claimed in claim 1, wherein the voltage input unit comprises:

a first switch for transmitting the first input voltage to an input of the first power block corresponding to the enable signal;

a second switch for transmitting the second input voltage to an input of the second power block corresponding to the enable signal; and a diode coupled between an output of the first power block and the second switch to block a voltage output from the output of the first power block from being transmitted to the second switch.

3. The power supply as claimed in claim 2, wherein only one of the first switch or the second switch is on at a time.

4. The power supply as claimed in claim 2, wherein one of the first switch or the second switch is a PMOS transistor, and the other one of the first switch or the second switch is an NMOS transistor.

5. The power supply as claimed in claim 1, wherein the second output voltage is equal to the first input voltage.

6. The power supply as claimed in claim 1, wherein the power supply is configured to be in the normal operation mode when the first input voltage is above a threshold voltage, and is configured to be in the alternate operation mode when the first input voltage is below the threshold voltage.

7. An organic light emitting display, comprising:

a display region for displaying an image corresponding to scan signals and data signals;

a scan driver for generating the scan signals and transmitting the scan signals to the display region;

a data driver for generating the data signals and transmitting the data signals to the display region;

a power supply for supplying a driving voltage to the display region, the scan driver, and the data driver; and a controller for monitoring a first input voltage and for selecting one of a normal operation mode or an alternate operation mode and outputting an enable signal corresponding to the monitoring of the first input voltage, wherein the power supply comprises:

a first power block for receiving the first input voltage to output a first output voltage and configured to be driven in the normal operation mode corresponding to the enable signal;

a second power block for receiving a second input voltage to output a second output voltage and configured to be driven in the alternate operation mode corresponding to the enable signal; and a voltage input unit for transmitting the first input voltage to the first power block in the normal operation mode, and for transmitting the second input voltage to the second power block and stopping the transmitting of the first input voltage to the first power block in the alternate operation mode, corresponding to the enable signal;

wherein the first input voltage is directly coupled to an output of the second power block.

8. The organic light emitting display as claimed in claim 7, wherein the voltage input unit comprises:

a first switch for transmitting the first input voltage to an input of the first power block corresponding to the enable signal;

a second switch for transmitting the second input voltage to an input of the second power block corresponding to the enable signal; and a diode coupled between an output of the first power block and the second switch to block a voltage output from the output of the first power block from being transmitted to the second switch.

9. The organic light emitting display as claimed in claim 8, wherein only one of the first switch or the second switch is on at a time.

10. The organic light emitting display as claimed in claim 8, wherein one of the first switch or the second switch is a PMOS transistor, and the other one of the first switch or the second switch is an NMOS transistor.

11. The organic light emitting display as claimed in claim 7, wherein the second output voltage is equal to the first input voltage.

12. The organic light emitting display as claimed in claim 7, wherein the controller is configured to select the normal operation mode when the first input voltage is above a threshold voltage, and to select the alternate operation mode when the first input voltage is below the threshold voltage.

* * * * *

UNITED STATES PATENT AND TRADEMARK OFFICE

CERTIFICATE OF CORRECTION

PATENT NO. : 8,279,212 B2
APPLICATION NO. : 12/637726
DATED : October 2, 2012
INVENTOR(S) : Min-Cheol Kim It is certified that error appears in the above-identified patent and that said Letters Patent is hereby corrected as shown below:

In the Claims

Column 5, Claim 1, line 27 — After "coupled"

Insert -- to an output of --

Signed and Sealed this
First Day of July, 2014

Michelle K. Lee

*Deputy Director of the United States Patent and Trademark Office*